Nov. 15, 1927.

F. A. STEVENS 1,649,790

METHOD OF MAKING OPHTHALMIC MOUNTINGS

Filed Oct. 23, 1926

Inventor
Frederick A. Stevens
by David Rines
Attorney

Patented Nov. 15, 1927.

1,649,790

UNITED STATES PATENT OFFICE.

FREDERICK A. STEVENS, OF PROVIDENCE, RHODE ISLAND, ASSIGNOR TO BAUSCH & LOMB OPTICAL COMPANY, OF ROCHESTER, NEW YORK, A CORPORATION OF NEW YORK.

METHOD OF MAKING OPHTHALMIC MOUNTINGS.

Original application filed May 15, 1922, Serial No. 560,956. Divided and this application filed October 23, 1926. Serial No. 143,613.

The present invention relates to methods of making ophthalmic mountings, and though certain features thereof are applicable to other mountings, the invention relates more particularly to spectacle temples.

Figure 1:
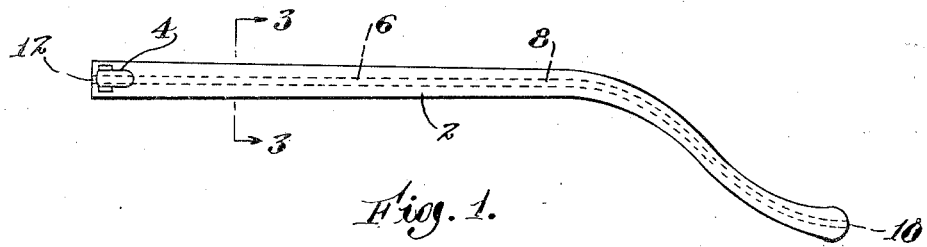
Figures 2, 3, 4:
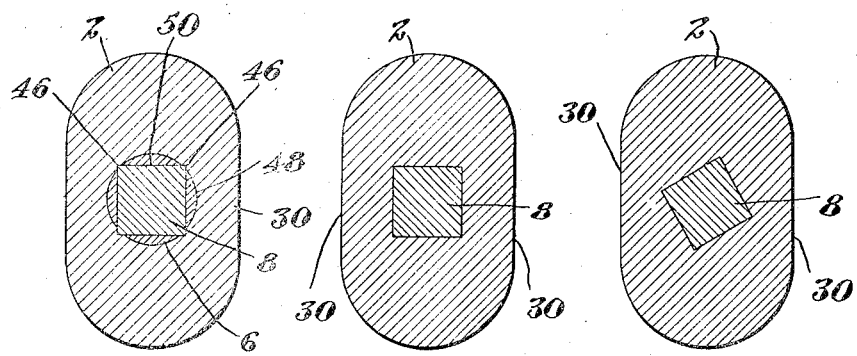

In the accompanying drawings, Fig. 1 is a side elevation of a spectacle temple constructed according to the preferred method of the present invention; Fig. 2 is a section taken upon the line 3—3 of Fig. 1, illustrating the preferred method of manufacture; Fig. 3 is a similar section of the completed article; Fig. 4 is a similar section of a modification; and Figs. 5 to 8 inclusive are sections of modified reinforcing rods.

The invention is illustrated as applied to a spectacle temple of the combined-metal-and-non-metal type, which is chosen to typify any ophthalmic mounting. The temple comprises a non-metal member 2 provided at its forward end with a hinge plate 4, whereby it may be hinged to a spectacle-lens frame. The member 2 is skived down to cause it to taper on its outer surface from the forward end towards the rear end, as shown in Fig. 1, and to cause it to become taperingly flattened at the sides 30. Spectacle temples of this type are commonly constituted of non-metal material wholly, and are therefore comparatively heavy and clumsy, and rather thick at the rear end, to provide the necessary rigidity for holding the temple in place behind the ear. This is particularly true of skull temples, for the rear ends of skull temples are designed to engage, and hold firmly against, the skull, and this they can not do unless the non-metal material is thick and of substantial proportions.

According to the invention claimed in a copending application, Serial No. 497,640, filed September 1, 1921, it is possible to make the thickness of the rear end of the temple small compared to that of the forward end, the required rigidity being attained by the use of a reinforcing member. To this end, the non-metal member 2 is constituted of a seamless tube within the bore 6 of which is completely enclosed a reinforcing member 8, such as a metal rod. A temple so constructed, though very thin at the rear end, will maintain any form into which it may be shaped, and will be strong enough to press firmly in, and to hold against, the skull. The ends of the bore are plugged with non-metal plugs 10 and 12, effectually concealing the reinforcing member. The plugs are integrally secured to the walls of the bore 6, as by the use of a solvent, or in any other desired manner. It is found, in practice, however, that in a temple so constructed, there is a tendency for the metal rod to twist in the bore 6 when the parts of the temple are bent to shape. This twisting, of course, destroys the rigidity of the structure as a whole, and the degree of twist increases with use.

Figures 5, 6, 7, 8:
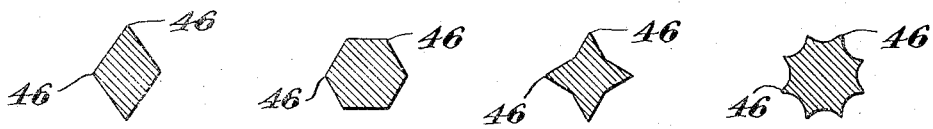

According to the invention disclosed in a copending application, Serial No. 560,956, filed May 15, 1922, of which the present application is a division, this twisting effect is eliminated by the use of a reinforcing rod 8 that is provided with sharp or nearly sharp ridges 46 that bite into, and so become embedded within, the non-metal material. As the ridge or ridges extend continuously substantially throughout the length of the rod, it is obviously impossible for a rod 8 so embedded to twist in its bore 6. The preferred reinforcing rod 8 is square in cross section, as shown in Figs. 2, 3 and 4, but this is not essential, as other cross-sectional shapes may equally well be employed. In the interest of increased rigidity, the rod should not yield or bend transversely more readily in one direction than another, so that if the rod is not strictly square in cross section, it should have some of the properties of the square-sided configuration. Reinforcing rods that are diamond-shaped in cross section, as shown in Fig. 5, or hexagonal, Fig. 6, or hectagonal, Figs. 7 and 8, are all adapted to the purpose in hand. A regular hectagon would not be so useful, because approximately too much to the shape of a circle; but if provided with re-entrant angles or curves, as shown in Figs. 7 and 8, and in a copending application, Serial No. 79,135, filed January 4, 1926, the ridges 46 are rendered more pronounced. It is not essential that the reinforcing rods occupy any particular position in the non-metal member, as will be understood from Figs. 3 and 4, both of which represent efficient constructions.

According to the method of the present invention, the wall of the bore 6, which is usually originally circular in cross section, as shown at 48 in Fig. 2, is first preferably softened, as by the use of alcohol, acetone or other solvent, after which the reinforcing rod is forced into the bore. The rod may, if desired, be turned or twisted slightly during the forcing action. The ridges 46 dig into the non-metal material as the rod is forced into the bore, becoming firmly locked in place, and the softened non-metal material collects between the faces 50 of the rod and the wall of the bore 6, acting as a lubricant while the rod is being forced into place, but becoming ultimately hardened and solid, as will be understood from Fig. 3. It will therefore be understood that the diameter of the bore 6 should be greater than the side of the cross-sectional square shown in Fig. 2, but less than the diagonal of the square, and similar considerations will hold with other shapes than squares. After the parts have become set, the temple is bent into the required shape, illustrated in Fig. 1. It will be found that the metal and the non-metal material will bend as a unit, without twisting.

The invention is obviously not restricted to the exact embodiment that is described herein, as modifications within the spirit of the invention will occur to persons skilled in the art, and all such are intended to be embraced within the scope of the appended claims.

What is claimed as new is:

1. A method of making a spectacle temple that comprises providing a non-metal tube with a bore extending substantially throughout its length, providing a reinforcing rod with a ridge extending continuously substantially throughout its length, the thickness of the rod through the ridge being greater than the diameter of the bore, and forcing the rod into the bore substantially throughout its length and causing the ridge to become firmly embedded in the non-metal material substantially throughout its length.

2. A method of making a spectacle temple that comprises skiving a non-metal tube to cause it to taper from the forward end towards the rear end and to cause the opposite sides to become flattened, whereby the thickness of the rear end is made small compared to that of the forward end, providing a reinforcing member with a substantially sharp ridge extending substantially throughout its length, the thickness of the reinforcing member through the ridge being greater than the diameter of the bore, forcing the reinforcing member into the bore of the non-metal tube substantially throughout its length and causing the ridge to become firmly embedded in the non-metal material substantially throughout its length, and bending the non-metal tube with the reinforcing member therein into the shape of a spectacle temple.

3. A method of making a spectacle temple that comprises providing a non-metal tube, providing a reinforcing rod that is square in cross section and the diagonal of the cross section of which is greater than the diameter of the bore, forcing the reinforcing rod into the bore of the non-metal tube and causing the corners of the square to become firmly embedded in the non-metal material, and bending the tube with the rod therein into the shape of a temple.

In testimony whereof, I have hereunto subscribed my name.

FREDERICK A. STEVENS.